Dec. 5, 1961 D. E. KAMMER ET AL 3,012,172

ELECTRONIC COMPONENTS ASSEMBLY

Filed Dec. 30, 1957 3 Sheets-Sheet 1

INVENTORS.
DONALD E. KAMMER.
BY WILLIAM T. WOOD.
Alden D. Redfield
Irwin P. Garfinkle
ATTORNEYS.

Dec. 5, 1961 D. E. KAMMER ET AL 3,012,172

ELECTRONIC COMPONENTS ASSEMBLY

Filed Dec. 30, 1957 3 Sheets-Sheet 2

INVENTORS.
DONALD E. KAMMER.
WILLIAM T. WOOD.

BY Alden D. Redfield
Irwin P. Garfinkle
ATTORNEYS.

INVENTORS.
DONALD E. KAMMER
WILLIAM T. WOOD.
BY Alden D. Redfield.
Irwin P. Garfinkle
ATTORNEYS.

United States Patent Office 3,012,172
Patented Dec. 5, 1961

3,012,172

ELECTRONIC COMPONENTS ASSEMBLY

Donald E. Kammer and William T. Wood, Cincinnati, Ohio, assignors to Avco Manufacturing Corporation, Cincinnati, Ohio, a corporation of Delaware Filed Dec. 30, 1957, Ser. No. 705,922
8 Claims. (Cl. 317—101)

This invention relates to mechanical assemblies for the components of electronic equipment and, more particularly, to a mechanical assembly which permits ease of fabrication, maintenance and repair by semi-skilled mechanics.

Electronic equipment, particularly that used for industrial and military purposes, is becoming more and more complex, and the problem of maintenance is necessitating mechanical assemblies which enable the unskilled or semi-skilled mechanic to service defective equipment. An advance in this area in recent years has resulted from the use of modules for housing various circuit components or stages which may be plugged into or otherwise connected to the main chassis. In accordance with our invention we have used modular techniques in the mechanical assembly of complex electronic equipment and, in addition, we have provided means for very rapid and simple trouble-shooting and repair.

Briefly stated, our invention contemplates the use of modular type units plugged into one side of a printed circuit board, on the other side of which is mounted an insulating template. On the template are provided printed outlines showing the physical location of each of the modules and, in addition, the template is provided with a plurality of holes arranged to cooperate with various test points on the printed circuit board. By inserting the probe of a conventional vacuum type voltmeter through the template holes and contacting various test points in the printed circuit, the voltage at certain critical locations in each of the modules may be tested. If the necessary voltage does not appear at a given test point, the module indicated is defective and may be unplugged and replaced with a new unit.

It is a broad object of our invention to provide a mechanical arrangement for electronic equipment which will permit accurate assembly and maintenance by semi-skilled or unskilled personnel.

Another object of this invention is to provide a mechanical assembly of the components of electronic equipment which permits convenient access to components of normal limited life expectancy.

Another object of this invention is to provide a mechanical assembly of electronic equipment which permits access to components of normal limited life expectancy, and to provide therewith an insulating template which includes an outline of the mechanical assembly, a series of holes cooperating with test points in the various units of the assembly, and necessary circuit data for said test points.

For further objects and a more complete understanding of the nature of our invention, reference is made to the following detailed description and to the accompanying drawings, in which;

FIG. 2 is a blown-apart, cross-sectional view of the fixed frequency section taken through the line 2—2 of FIG. 3, with certain of the modules removed;

Figure 1:
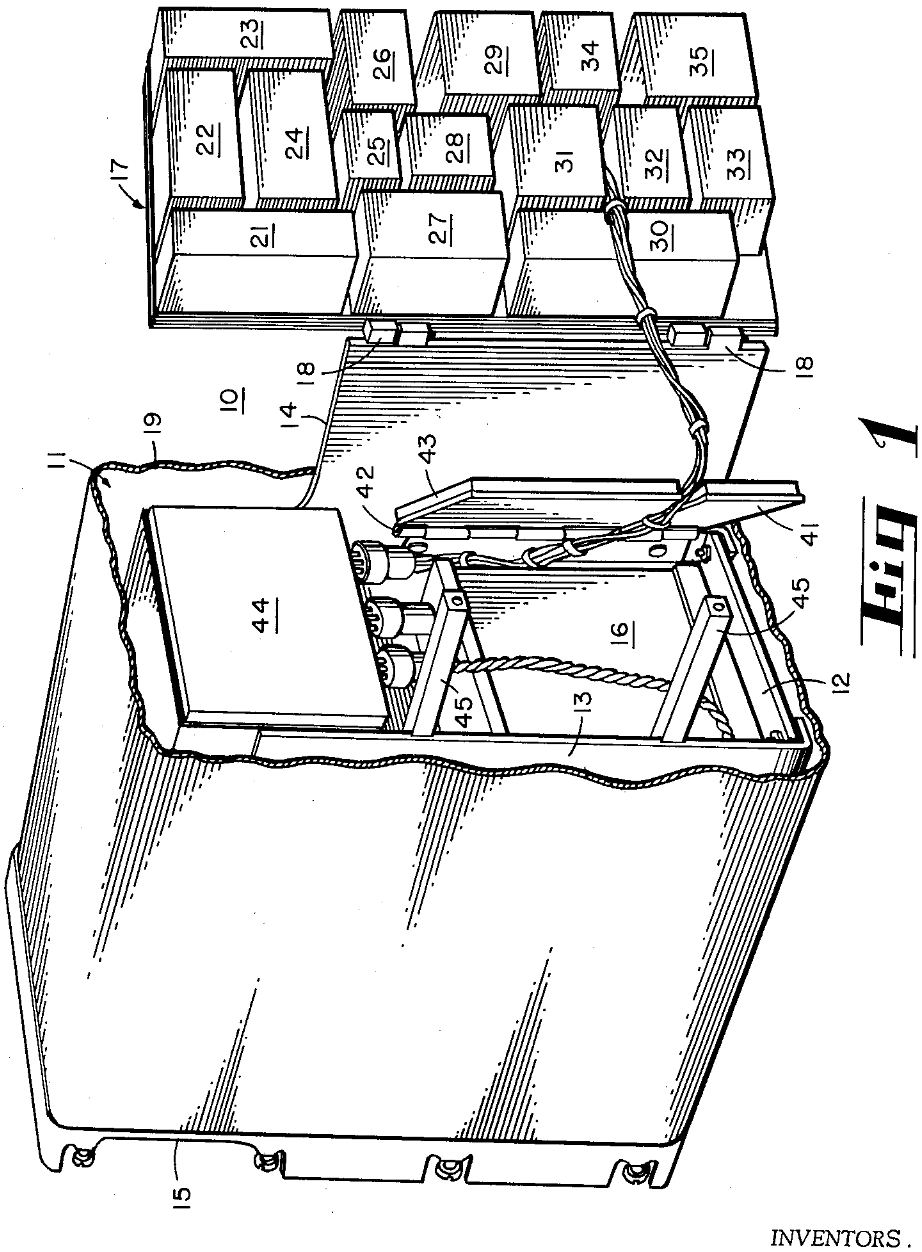
FIG. 1 is a perspective view showing the rear end of a high frequency radio receiver with the fixed frequency section exposed.

Referring now to the drawings, there is shown a high frequency, tunable radio receiver 10, the components of which are divided into two sections and mounted on suitable supports. The front section 11 comprises the tunable radio frequency portion of the receiver, and it includes such components as the radio frequency amplifiers, oscillator, mixer, tuning capacitors, dials, etc. The components of the front section 11 are mounted on a suitable support, including chassis 12, side walls 13 and 14 and a front wall 15. Dials (not shown) for volume control, frequency selection, etc., are mounted on the front wall 15, while the tunable electrical components, including the amplifiers, mixers, etc., are arranged in suitable modules 16 and are mounted on the chassis 12 between the front and side walls. The rear of the receiver includes the fixed frequency section 17 which is pivotally mounted from an extension of the side wall 14 by means of hinges 18. When fully assembled, the entire apparatus is enclosed by a suitable protective cover 19.

Figure 4:
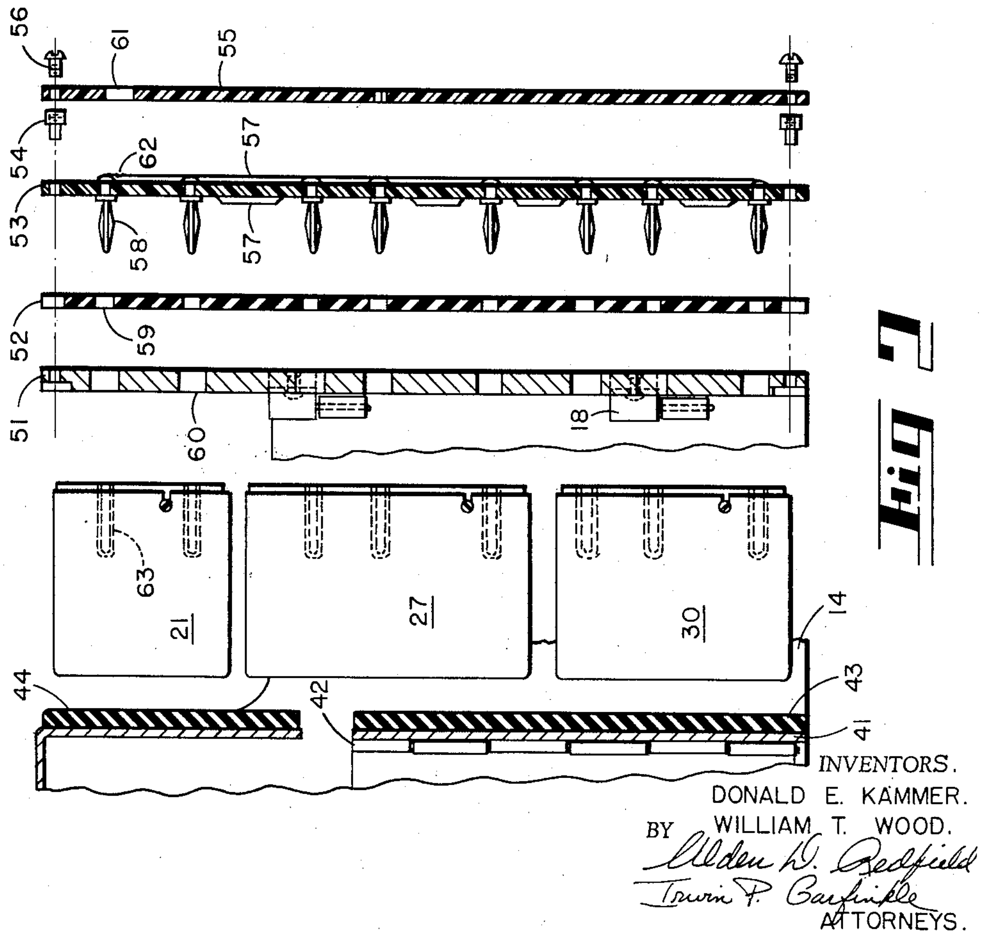
FIG. 4 is a block diagram of the illustrated receiver for showing the electrical relationship of the various modular components.
Figure 4:
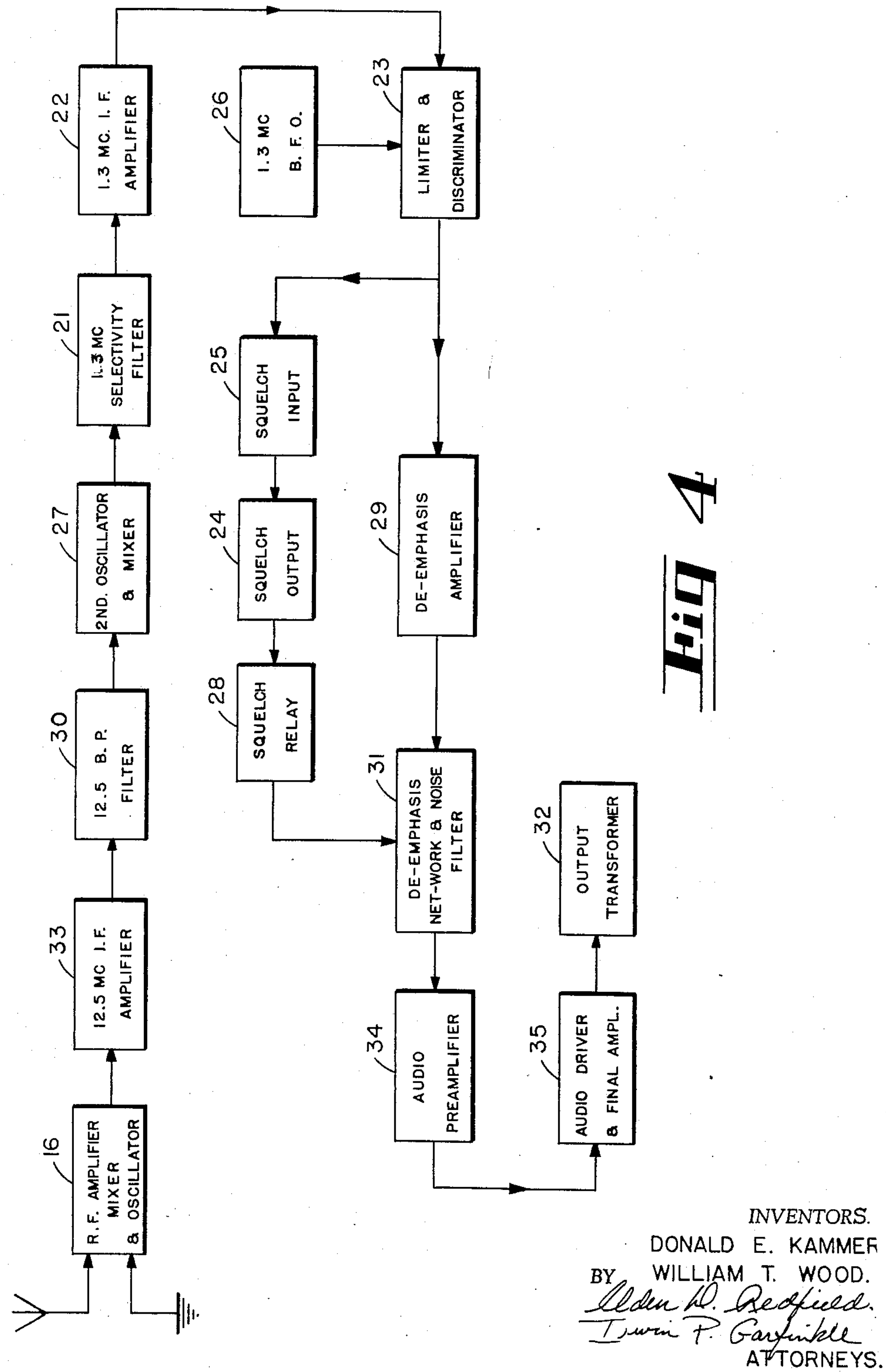

The fixed frequency section 17 is arranged in module form, each module housing one or more fixed frequency stages, and in the embodiment illustrated there are fifteen modules 21–35, the relationship of which may be seen by comparison with the block diagram of the receiver illustrated in FIG. 4. While the arrangement illustrated in FIG. 4 is very similar to that of apparatus reduced to practice and useful in a portable installation, it is to be understood that we do not limit ourselves to the particular electronic arrangement or to a radio receiver, but the techniques involved may be applied to any electronic equipment, such as computers, control systems, etc.

Also mounted on the side wall 14 is a door 41 pivoted by means of hinges 42 and provided with a rubber pad 43. In addition, a rubber pad 44, mounted on a suitable support, is fixed above the door 41 between the side walls 13 and 14. When it is desired to prepare the receiver for operation, the door 41 is closed and the fixed frequency section 17 is pivoted on the hinges 18 until the modules abut the rubber pads 43 and 44. The entire section 17 may be firmly secured to the fixed studs 45 which are adapted to receive screws extending through the module support. In this way excessive vibration of the section 17 is avoided by means of the pads 43 and 44 and, at the same time, convenient access to the modules 16 is provided through the door 41. Depending on the arrangement of the modules 16, it is clear that the door 41 and pad 44 may be combined into a full-length, padded door or that more than one door may be provided.

Figure 3:
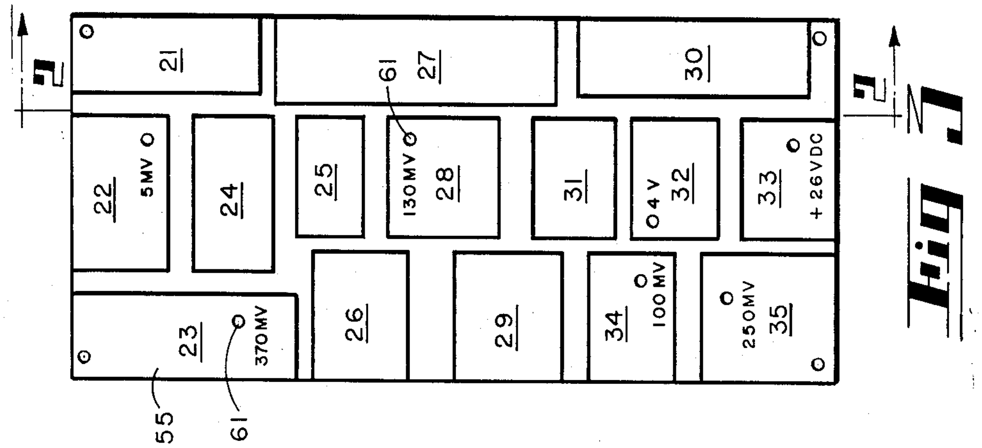
FIG. 3 is a plan view of the template used in accordance with this invention as viewed from the rear of the receiver.

The assembly of the fixed frequency sections 17 is most clearly shown in FIGS. 2 and 3. The entire fixed frequency section 17 is supported from a metallic plate 51 which carries one portion of the hinges 18. The plate 51, an insulator board 52 and a printed circuit board 53 are riveted together by means of rivets 54 to provide a unitary structure for mounting the modules 21–35, and a template 55 constructed of an insulating material may then be attached to the unitary structure by means of the screws 56. Printed circuitry 57 is deposited on each side of the printed circuit board 53 and, in addition, the board 53 is provided with male banana plugs 58 fixed at right angles thereto. The insulator board 52 has been provided for insulating the printed circuitry 57 from the metallic supporting plate 51, and it has been drilled at points 59 to provide passage for the banana plugs 58. Similarly, holes 60 have been drilled in the plate 51, but to avoid the possibility of short circuits, it will be noted that these holes have been considerably enlarged.

The template may be made of transparent plastic and, as seen in the plan view of FIG. 3, the outline of each module is drawn thereon to show the position of each module in the section 17. Moreover, it will be noted that small holes 61 have been drilled in the template at various locations opposite various test points 62 in the printed circuit board. These test points are connected by means of the printed circuitry 57 to various critical portions of the circuits in the modules and, thus, the voltage at these points may be read by inserting the probe of a voltmeter through the template holes 61. In addition, the voltage which is required at a given test point is printed on the template adjacent the respective hole 61 and, thus, the operator who knows only how to operate and read a conventional voltmeter may troubleshoot the intermediate frequency section of the receiver by comparing the reading with the required voltage. If the voltage does not coincide with that printed on the template at the test point, the operator knows that the module defined by the tracing on the template, or a module ahead of it in the network, is defective.

Each of the modules 21–35 is provided with female receptacles 63 for tightly receiving the male banana plugs 58. This arrangement of the plugs 58 on the printed circuit board 53 rather than on the modules is advantageous, particularly for the unskilled mechanic, since the modules may be subjected to more abuse than usual without fear of breaking the plugs. It will also be noted that each of the modules may contain printed circuitry and sub-modular construction; however, these features are not illustrated or claimed as a part of this invention. With the modules plugged onto the banana plugs 58, it may be seen that the entire fixed frequency section 17 is supported from the wall 14 and that it may be pivoted into position on the hinges 18 and secured to the studs 45.

In practice, if an operator finds that the equipment is not operating properly he may simply remove the screws connecting the section 17 to the studs 45 and swing out the entire fixed frequency section to the position shown in FIG. 1. If the operator finds the voltage appearing at the test points 62 of the template 55 does not coincide with the printed values at these points, he may simply unplug the defective modules and plug in new ones. At the same time the entire radio frequency section is also made accessible through the door 41, and this section can also be conveniently reached and serviced. Defective modules may be discarded or repaired at a later time by a more skilled technician.

It is seen, therefore, that we have provided an assembly which affords easy access and servicing of all parts of a radio receiver having limited life expectancy and that techniques have been produced for servicing of electronic components by an unskilled or semi-skilled mechanic. While we have illustrated a tunable radio receiver, it is clear that the techniques disclosed and hereinafter claimed may be adapted equally as well to other types of electronic equipment. It is also clear that many modifications may be made to the assembly without departing from the spirit of our invention, and for this reason it is our intention to be limited only by the scope of the appended claims.

Having thus described our invention, what we claim is:

1. An assembly for electronic components comprising: an insulating board carrying printed circuitry thereon, said printed circuitry including a plurality of test points on one side of said insulating board; a plurality of modules containing said electronic components; means for connecting said modules to said printed circuitry, said means comprising a plurality of male plugs mounted on the other side of said insulating board and a plurality of female receptacles in each of said modules, said female receptacles being adapted to receive said male plugs; and a template secured to said one side of said insulating board, said template having a plurality of probe receiving holes, each of said holes being positioned opposite each of said test points.

2. The invention as defined in claim 1 wherein the outline of each of said modules is printed on said template.

3. The invention as defined in claim 1 wherein the proper voltage at each test point is printed on said template adjacent each of the respective holes in said template.

4. The invention as defined in claim 3 wherein the outline of each of said modules is printed on said template.

5. An electronic assembly, including at least a first and a second section, said assembly comprising: a chassis for supporting said first section, said chassis including a wall; a plate for supporting said first section; means for pivotally mounting said plate on said wall; an access door pivoted on said wall between said first section and said second section, the pivotal axes of said plate and said door being parallel; a shock-absorbent pad fixed on said access door; said second section including an insulated printed circuit board, printed circuitry deposited on said board and a plurality of modules plugged into said printed circuitry, said pads on said door providing a shock-absorbent support for the modules of said second section when said second section is pivoted against said first section.

6. The invention as defined in claim 5 wherein said printed circuitry includes test points for said modules.

7. The invention as defined in claim 6 wherein a template is mounted on the side of said printed circuit board opposite said modules, and wherein said template is provided with printed outlines showing the location of each of said modules, and wherein said template is provided with holes cooperating with said test points in said printed circuits.

8. The invention as defined in claim 7 wherein desired voltage values at each of said test plates are printed on said template adjacent the respective holes.

References Cited in the file of this patent

UNITED STATES PATENTS

| | | |
|---|---|---|
| 2,028,717 | Hayden | Jan. 21, 1936 |
| 2,145,798 | Merkel | Jan. 31, 1939 |
| 2,439,326 | Wilson | Apr. 6, 1948 |
| 2,594,565 | Kenney | Apr. 29, 1952 |
| 2,804,607 | Nalle | Aug. 27, 1957 |
| 2,857,558 | Fiske | Oct. 21, 1958 |

FOREIGN PATENTS

| | | |
|---|---|---|
| 1,041,950 | France | Oct. 27, 1953 |

OTHER REFERENCES

Supplement 1A to Lambda Catalog 55, May 1955, titled: Special Features "1500" Series, published by Lambda Electronics Corp. of Northern Boulevard, Corona 68, New York.